WIRE HANDLING APPARATUS

Original Filed Aug. 10, 1960 3 Sheets-Sheet 1

INVENTOR
E. J. CRUM
BY Albert J. Kramer
ATTORNEY

WIRE HANDLING APPARATUS

Original Filed Aug. 10, 1960 3 Sheets-Sheet 2

INVENTOR
E. J. CRUM

BY Albert J. Kramer
ATTORNEY

WIRE HANDLING APPARATUS

Original Filed Aug. 10, 1960 3 Sheets-Sheet 3

INVENTOR
E. J. CRUM

BY Albert J. Kramer
ATTORNEY

United States Patent Office

Re. 26,052

Reissued June 28, 1966

26,052

WIRE HANDLING APPARATUS

Eben Jefferson Crum, P.O. Box 6763, Towson, Md.

Original No. 3,103,237, dated Sept. 10, 1963, Ser. No. 48,700, Aug. 10, 1960. Application for reissue Mar. 30, 1965, Ser. No. 457,237

15 Claims. (Cl. 140—2)

Matter enclosed in heavy brackets [ ] appears in the original patent but forms no part of this reissue specification; matter printed in italics indicates the additions made by reissue.

This invention relates to the handling of wire or rod-like materials and it is more particularly concerned with apparatus and methods for processing such materials in continuous lengths.

An object of the invention is the provision of a method and of apparatus for carrying out the method by which the material is automatically arranged in a form suitable for receiving treatment, then carried through a treatment zone and then rearranged into package form.

Another object of the invention is the provision of such a method and apparatus by virtue of which the treatment may be effected in a continuous manner.

A further object of the invention is the provision of such a method and apparatus by virtue of which the material is arranged in a form such that a relatively large area thereof is subjected to treatment in a relatively small treatment zone at any given time.

A still further object of the invention is the provision of such a method and apparatus whereby the material to be treated is arranged on a conveyor system in the form of successive loops which are passed through a treatment zone in that form, and then the loops are rearranged into a package for storage and transportation.

A still further object of the invention is to impart differential motion to adjacent loops as they are being transferred by the conveyor system so as to rearrange the relative positions thereof for various purposes.

A still further object of the invention is the provision of apparatus for receiving wire or rod-like materials to be formed into a coil and subjecting the material to a desired treatment as an integral part of the handling for the coiling procedure, thereby conserving a number of operations as compared to previously known procedures.

These and still further objects, advantages and features of the invention will appear more fully from the following description, considered together with the accompanying drawing.

Figure 1A:
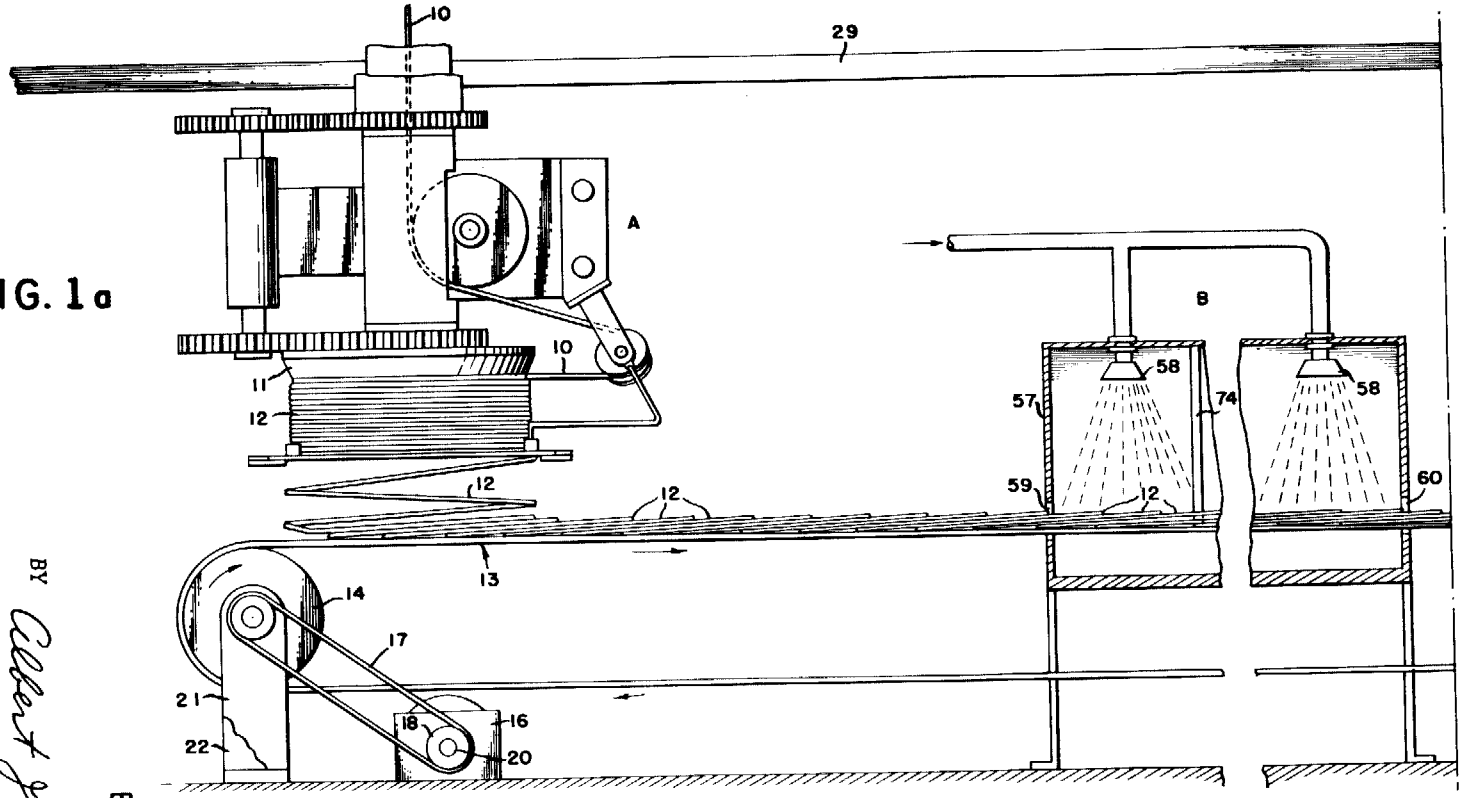
FIG. 1a is a side elevational view of a longitudinal portion of an embodiment of the apparatus of the invention, partly broken away.
Figure 2:
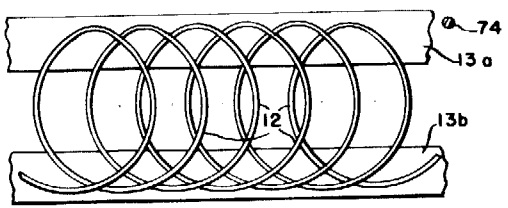
FIG. 2 is a fragmentary plan of a part of the belt conveyor and loops carried thereby.
Figure 1B:
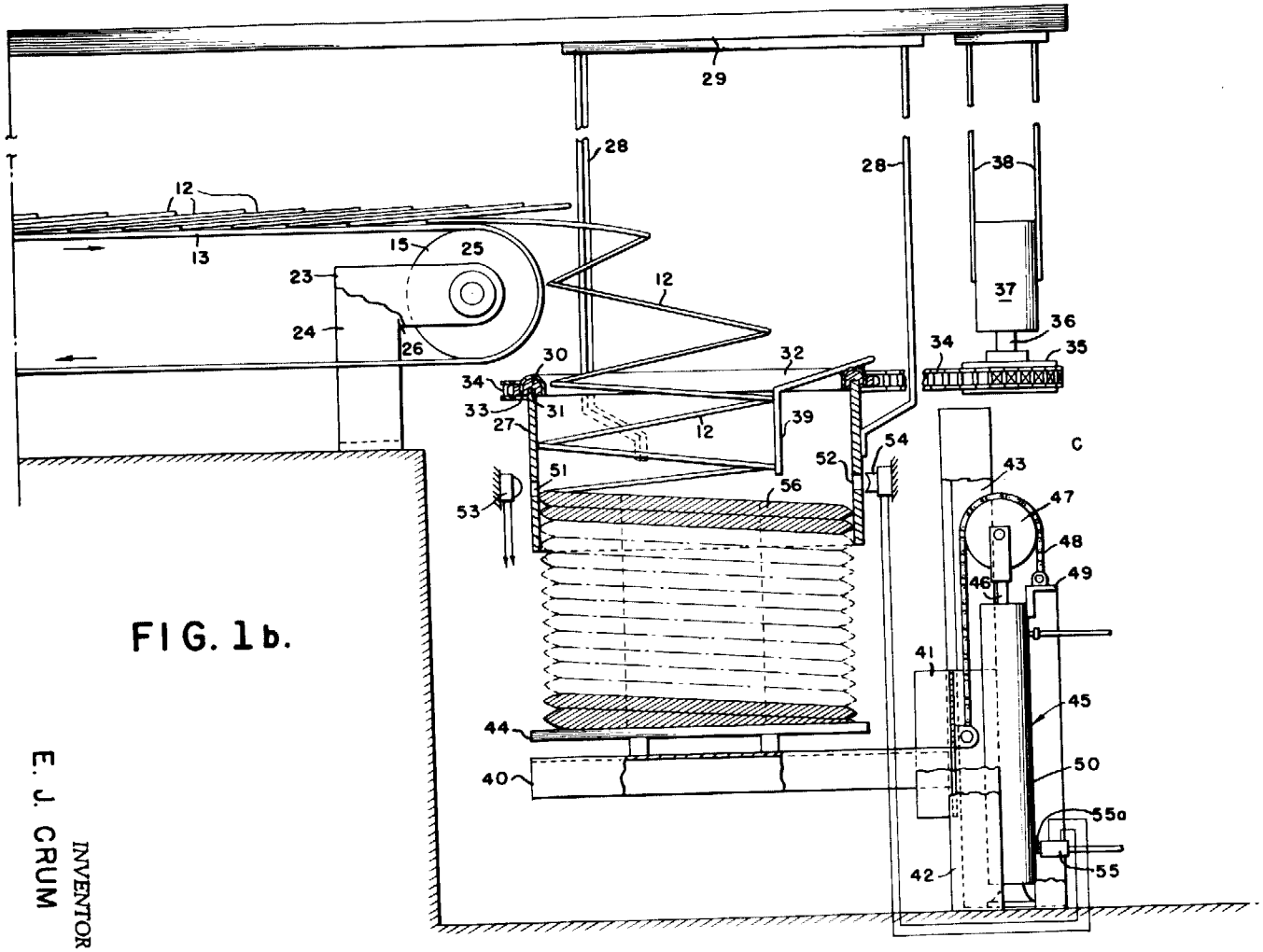
FIG. 1b is a side elevational view of the remaining longitudinal portion of the embodiment, partly broken away.

Referring with more particularity to the drawing in which like numerals designate like parts, the embodiment illustrated in FIGS. 1a, 1b and 2 comprises a loop forming device, generally designated by the letter A, a treatment zone or chamber B and a coiling unit C.

The loop forming device A comprises a conventional form of stationary block 11 around which loops 12 are formed at the top from a length of wire 10 continuously fed to it. These loops are discharged from the bottom of the block serially. A suitable form of block and an explanation of its various parts and functions is set forth in more detail in my copending application for patent Ser. No. 773,444, filed November 12, 1958, Patent No. 3,061,229.

Below the block 11 there is disposed a belt conveyor 13 comprising a pair of laterally spaced endless belts 13a and 13b supported on end rollers 14 and 15 and as many additional rollers (not shown) as might be needed to support any given length of belt. The belt conveyor is driven by a variable speed motor 16 connected by a belt 17 and pulleys 18 and 19 to the take-off shaft 20 of the motor or any other suitable source of power. Other suitable gearing means may also be used.

The end rollers 14 and 15 are roatably supported by pairs of rear columns 21 and 22 and forward columns 23 and 24, respectively. The forward columns 23 and 24 support the roller 15 on forwardly projecting cantilever arms 25, 26 so as to overhang the mouth or intake of the coil forming unit C, said unit being disposed therebelow.

The coil forming unit C comprises a vertical cylinder shell 27 supported by suspenders 28 from an overhead structural member 29 or by an other suitable means. The diameter of the cylinder 27 is equal to the diameter of the coil to be formed and is larger than the diameter of the loops 12.

The cylinder 27 is surrounded by an annular track 30 having an annular groove 31 at the bottom for receiving the upper edge of the cylinder. A sprocket wheel 32 comprises an inverted annular channel 33 which engages the track 30 and is rotatable thereon. This sprocket wheel meshes with a sprocket chain 34 which, in turn meshes with sprocket wheel 35 of a powered shaft 35, such as of a variable speed electric motor 37 or some other suitable source of power.

The motor 37 may be supported by hangers 38 from the structural overhead member 29.

One end of a deflector arm 39 is welded or otherwise secured to the wheel 32 at an angle such that the opposite end of the arm extends diagonally downward on the inside of the cylinder 27 to a point spaced from the opposite side a distance substantially equal to the diameter of the loops 12.

Below the cylinder 27 there is disposed an elevator 40 projecting inwardly cantileverwise from a vertically movable member 41 slidable mounted between columns 42 and 43 to one side of the cylinder 27. The elevator 40 is adapted to removably support a conventional skid 44.

The elevator is vertically moved by means of a hydraulic jack 45, the ram 46 of which is provided with a pulley 47 at the top engaging a chain or cable 48. One end of the cable is connected to the member 41 and the other end is anchored to a bracket 49 secured to the stationary cylinder 50 of the jack.

At a point below the bottom of the arm 39 and above the bottom of the cylinder 27, there are disposed a pair of diametrically opposite openings 51 and 52. A light source 53 is disposed on one side to project a beam of light across the cylinder from one of these openings to the other onto a photoelectric cell 54 at the opposite side of the cylinder 27. The photoelectric cell is conventionally electrically connected to a solenoid hydraulic valve 55 in the hydraulic line 55a of the jack 45 so that when the light beam is broken, the valve is opened to release fluid from the supporting column of liquid in the jack to lower the ram 46 and, hence, lower the elevator 40 until the coil in the cylinder falls below the light beam, whereupon the light beam again falls on the photoelectric cell to close the solenoid valve 55 and thus arrest further downward movement of the elevator.

By these means, the loops of wire fall down from the belt conveyor, drop into the upper end of the cylinder 27 and, as the sprocket wheel 32 rotates, the coils are displaced in a helical pattern by the arm 39 in overlapping relation to form a circular coreless coil or bundle 56. As incremental portions of the bundle are formed on the platform, the platform is automatically lowered, as explained above, until the desired amount of loops are included in the bundle, whereupon the bundle resting on the skid 44 is removed and a fresh skid put in its place.

As the loops fall from the block 11 onto the belt conveyor 13, the degree of overlap of successive loops can be controlled by varying the speed of the motor 16 or otherwise varying the relative speed of the belt conveyor 13 in relation to the frequency with which the loops 12 are discharged by the block.

The loops carried by the belt conveyor 13 may be subjected to processing steps, such as conventional pickling or acid treatment, annealing, heat treatments of various kinds, coating, descaling, cleaning, etc., or any combination of treatments. To illustrate this feature of the invention, there is shown in the drawing an enclosure 57 as a treatment chamber or zone symbolic of all the various treatments to which the loops may be subjected, such as being sprayed with a liquid from nozzles 58. It is to be understood, therefore, that this showing is for the purpose of illustration only and not for the purpose of limitation.

The walls of the enclosure, where appropriate, are provided with an inlet 59 and an outlet 60, respectively, for the passage of the belt conveyor 13 and loops carried thereby, substantially as shown.

The overall operation of the apparatus is as follows: As the loops 12 are formed by unit A and as they are discharged therefrom one at a time, they fall on the belt conveyor 13. Due to the motion of the belt conveyor, the loops spread out in overlapping relation in a linear position on the belt in the direction of its motor, the degree of overlap depending upon the speed of the belt conveyor in relation to the frequency of discharge of the loops thereon. The loops, thus supported on the belt conveyor, are carried through one or more treatment zones, symbolized by the chamber or enclosure 57 and then discharged at the opposite end of the conveyor into the coil forming unit C where they are formed into a bundle 56 as explained above.

Figure 3:
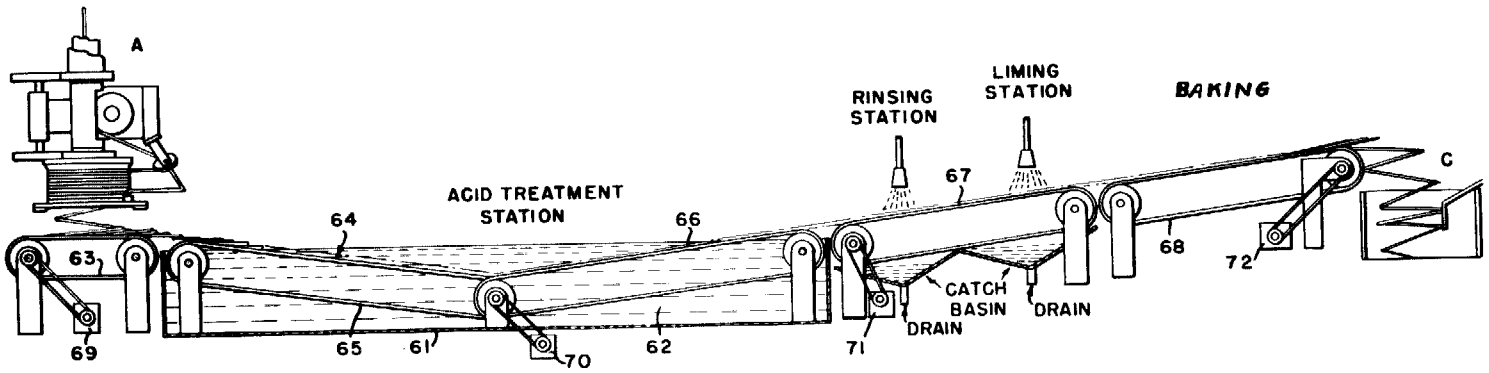
FIG. 3 is a schematic diagram of another embodiment of the invention partly broken away, showing the use of tandem belt conveyors to pass a layer of loops through a tank of liquid.

The schematic diagram of FIG. 3 illustrates a tank 61 containing a liquid 62 which may be for cleaning, coating, impregnation, plating, or for other treatment of the loops.

A belt conveyor 63 extends from the unit A to one end of tank 61. A belt conveyor 64 has a downwardly sloping, impregnation, plating, or for other treatment of the surface of the liquid 62.

An upwardly sloping section 66 of belt conveyor 64 extends from the forward end of the section 65 to the opposite end of tank 61. Between this point and coiler station C, additional conveyors in tandem, such as the belt conveyors 67 and 68 are disposed to carry the loops through various treatment stations or zones, such as those indicated on the drawing. By the use of separate conveyors at different stations, the loops can be rearranged relative to each other to secure the best advantage for the particular treatment.

Each of the belt conveyors comprises laterally spaced endless belts as in the case of the belts 13a and 13b of the conveyor 13 and is driven by separate variable speed motors 69, 70, 71 and 72, in order to permit changing the relative positions of the loops as they pass from conveyor to conveyor.

For example, by driving the belt conveyor 67 faster than conveyor 64, the loops will be spread out more on the conveyor 67. This would, among other things, permit areas covered by the overlapping of the loops on conveyor 64 to become exposed on the conveyor 67.

The proper spacing of the loops is also important in the formation of the coils at the station C. Accordingly, the speed of the belt conveyor 68 can be adjusted in relation to the speed of operation of the coiling apparatus.

The use of such tandem variable speed conveyors to change the position of the loops is generally illustrative of means that may be employed to shift the position of the loops. For example, a stationary abutment, like the bar 74 (see FIGS. 1a and 2), may be placed in the path of movement of the loops adjacent the edges to move the loops sideways.

Also, the belt conveyors may be in a straight line, or at an angle. Further, the pair of belts of each conveyor may be independently mounted (not shown) and independently driven at slightly different speeds to effect a shifting of the loops relative to each other. It is to be understood, therefore, that any means for imparting differential motion to adjacent loops as they are being conveyed, is within the scope of this invention.

*As indicated above, this invention relates to the handling of "wire or rod-like materials," the terms "wire" and "rod-like materials" being used interchangeably and are so to be interpreted throughout the specification and claims.*

It is also to be understood that the invention is not limited to a conveyor system comprising belts, but also includes other conventional conveyor systems, such as roller conveyors, gravity slides, Fourdrinier screens, etc.

Having thus described my invention, I claim:

1. Wire handling apparatus comprising a conveyor having a loading station and a discharge end; a stationary device directly above the conveyor at the loading station for receiving a continuous length of castable wire, presetting the wire into a series of consecutive circular loops of uniform diameter and dropping the preset loops one at a time directly onto the conveyor at the loading station, said conveyor being adapted to support the loops in a flat, generally horizontal position, whereby the loops in falling on the conveyor, can be made, due to the motion of the conveyor relative to the device, to become arranged thereon in overlapping relation with each loop overlying its immediately preceding loop and underlying its immediately succeeding loop; a unit at the discharge end of the conveyor for receiving the loops and arranging them in the form of a bundle on a horizontal surface, said unit having a horizontal platform being positioned directly below the discharge end of the conveyor, whereby each loop so arranged to underlie its immediately succeeding loop is disengaged therefrom and simultaneously removed therefrom in the form of a loop by the force of gravity alone and without the need for any intermediate rearrangement of the loops relative to the conveyor, means for moving the preset loops bodily relative to the platform in a horizontal direction as they fall.

2. Wire handling apparatus comprising a conveyor having a loading station and a discharge end; a stationary device directly above the conveyor at the loading station for receiving a continuous length of castable wire, presetting the wire into a series of consecutive circular loops of uniform diameter and dropping the preset loops one at a time directly onto the conveyor at the loading station, said conveyor being adapted to support the loops in a flat, generally horizontal position, whereby the loops in falling on the conveyor, can be made, due to the motion of the conveyor relative to the device, to become arranged thereon in overlapping relation with each loop overlying its immediately preceding loop and underlying its immediately succeeding loop; a unit at the discharge end of the conveyor for receiving the loops and arranging them in the form of a bundle on a horizontal surface, said unit having a horizontal platform and being positioned directly below the discharge end of the conveyor, whereby each loop so arranged to underlie its immediately succeeding loop is disengaged therefrom and simultaneously removed therefrom in the form of a loop by the force of gravity alone and without the need for any intermediate rearrangement of the loops relative to the conveyor, means for moving the loops bodily relative to the platform in a horizontal direction as they fall, and means between said loading station and discharge end for treating the loops as they are conveyed by the conveyor.

3. Wire handling apparatus as defined by claim 2, and means for varying the speed of the conveyor independently of the frequency with which the loops are discharged by the device, thereby to permit varying the degree of overlapping of successive loops on the conveyor.

4. Wire handling apparatus comprising a conveyor having a loading station and a discharge end; a stationary device directly above the conveyor at the loading station for receiving a continuous length of castable wire, presetting the wire into a series of consecutive circular loops of uniform diameter and dropping the preset loops one at a time directly onto the conveyor at the loading station, whereby the loops in falling on the conveyor, can be made, due to the motion of the conveyor relative to the device, to become arranged thereon in overlapping relation with each loop overlying its immediately preceding loop and underlying its immediately succeeding loop; a unit at the discharge end of the conveyor for receiving the loops and arranging them in the form of a bundle on a horizontal surface, said unit having a horizontal platform and being positioned directly below the discharge end of the conveyor, whereby each loop so arranged to underlie its immediately succeeding loop is disengaged therefrom and simultaneously removed therefrom in the form of a loop by the force of gravity alone and without the need for any intermediate rearrangement of the loops relative to the conveyor, means for moving the loops bodily relative to the platform in a horizontal direction as they fall, and means forming a chamber surrounding a portion of said conveyor, said chamber comprising a treatment zone for said loops, said chamber having entrance and exit openings for said conveyor and for loops of wire carried thereby.

5. Wire handling apparatus as defined by claim 2, means for supporting the conveyor at its loading station and at its discharge end; and a variable speed motor for driving said conveyor.

6. Wire handling apparatus comprising a conveyor having a loading station and a discharge end; a stationary device directly above the conveyor at the loading station for receiving a continuous length of wire, casting the wire into a series of consecutive circular loops of uniform diameter and thereafter dropping the loops one at a time directly onto the conveyor at the loading station, said conveyor being adapted to support the loops in a flat, generally horizontal position in a plane substantially parallel to the direction of motion of the conveyor, whereby the loops, in falling on the conveyor, can be made, due to the motion of the conveyor relative to the device, to become arranged thereon in overlapping relation with each loop overlying its immediately preceding loop and underlying its immediately succeeding loop; a unit at the discharge end of the conveyor for receiving the loops and arranging them in the form of a bundle on a horizontal surface, said unit being positioned directly below the discharge end of the conveyor, whereby each loop so arranged to underlie its immediately succeeding loop is disengaged therefrom and simultaneously discharged therefrom in the form of a loop by the force of gravity alone and without the need for any intermediate rearrangement of the loops relative to the conveyor, and means beween said loading station and discharge end for treating the loops as they are conveyed by the conveyor and means positioned proximate to said treating means for shifing the positions of consecutive loops on the conveyor relative to each other.

7. Wire handling apparatus as defined by claim 6 in which the means for shifting the relative positions of consecutive loops comprises a stationary member above the conveyor in the path of movement of the loops.

8. Wire handling apparatus as defined by claim 2 in which the conveyor comprises a belt conveyor.

9. Wire handling apparatus as defined by claim 8 in which the belt conveyor comprises a pair of laterally spaced endless belts and means for driving them simultaneously.

10. Apparatus as defined by claim 2 in which the conveyor comprises a first section and a second section arranged in juxtaposition tandemwise, and means for driving said sections at different relative velocities, whereby the loops in passing from one section to the other will become rearranged relative to each other when the sections are operated at different velocities.

11. Apparatus as defined by claim 2 in which the conveyor comprises a first section and a second section arranged in juxtaposition tandemwise located proximate to said treatment means, and means for driving said sections at different relative velocities whereby the loops in passing from one section to the other will become rearranged relative to each other when the sections are operated at different velocities.

*12. Wire handling apparatus comprising a loop forming device for receiving a continuous length of wire, forming it into a series of consecutive circular loops and discharging the loops serially therefrom, a coiling unit for arranging the loops of wire in the form of a coil, longitudinal conveyor means extending from a first station below said loop forming device to a second station above said coiling unit so as to receive said loops in consecutive, substantially horizontal, overlying relation as they are discharged by the loop forming device above the first station and transfer them in the overlying relation to the second station, said coiling unit comprising a platform for receiving and supporting a series of loops in the form of a coil and a deflector preventing further longitudinal movement of successive underlying loops as they are discharged from said conveyor means, said loops being thereupon left free to fall by gravity consecutively onto said platform, and means between the said loop forming device and coiling unit for treating the loops as they are conveyed by the conveyor means.*

*13. Wire handling apparatus as defined by claim 12 in which the conveyor comprises a first section and a second section arranged in juxtaposition tandemwise, and means for driving said sections at different relative velocities, whereby the loops in passing from one section to the other will become rearranged relative to each other when the sections are operated at different velocities.*

*14. The method of handling wire comprising forming in a continuous length of wire a series of consecutive loops, arranging the loops so formed linearly on a conveyor in consecutive, substantially horizontal, overlapping relation to expose them for treatment, passing the loops so arranged through a treatment zone, thence discharging the loops from said conveyor, preventing further longitudinal movement of successive underlying loops as they are thus discharged and leaving them to fall by gravity to form a coil.*

*15. In wire handling apparatus, the combination with conveyor means adapted to support a series of loops in flat, generally horizontal position, such loops being arranged on said conveyor in overlapping relation, and a coiling unit comprising a platform located below the discharge end of said conveyor means and adapted to receive and support a series of loops in the form of a coil and a deflector preventing further longitudinal movement of successive underlying loops as they are discharged from said conveyor means, said loops being thereupon left free to fall by gravity consecutively onto said platform.*

(References on following page)

References Cited by the Examiner

The following references, cited by the Examiner, are of record in the patented file of this patent or the original patent.

UNITED STATES PATENTS

| | | | |
|---|---|---|---|
| 586,866 | 7/1897 | Potter | 198—33.2 |
| 1,445,899 | 2/1923 | McGregor | 198—29 |
| 1,490,544 | 4/1924 | Stern | 140—71.3 |
| 1,597,465 | 8/1926 | Hepperle | 198—76 |
| 1,959,238 | 5/1934 | Horsfield | 198—34 |
| 1,972,489 | 9/1934 | Rideout et al. | 198—34 |
| 2,572,325 | 10/1951 | Ernst | 198—29 |
| 2,629,564 | 2/1953 | Bell | 242—82 |
| 2,840,224 | 6/1958 | Lefief | 198—76 |

| | | | |
|---|---|---|---|
| 2,847,171 | 8/1958 | Keesee | 242—82 |
| 2,863,615 | 12/1958 | Kenmore et al. | 242—83 |
| 2,880,850 | 4/1959 | Keathley et al. | 198—131 |
| 2,915,168 | 12/1959 | Whitmore | 198—131 |
| 2,936,508 | 5/1960 | Buddeck | 28—21 |
| 2,953,234 | 9/1960 | Abendschein | 198—76 |
| 2,954,180 | 9/1960 | Crum | 242—83 |
| 2,959,271 | 11/1960 | Adamson | 198—76 |
| 3,056,433 | 10/1960 | Haugwitz | 140—2 |

FOREIGN PATENTS

| | | |
|---|---|---|
| 1,163,310 | 4/1958 | France. |

CHARLES W. LANHAM, *Primary Examiner.*

R. J. HERBST, *Assistant Examiner.*